United States Patent
Hail et al.

(10) Patent No.: US 7,966,204 B1
(45) Date of Patent: Jun. 21, 2011

(54) SYSTEM AND METHOD FOR PROCESSING INSURANCE CLAIMS

(75) Inventors: Mitzl R. Hail, Louisville, KY (US);
Mark Bates, Louisville, KY (US)

(73) Assignee: Trover Solutions, Inc., Louisville, KY (US)

( * ) Notice: Subject to any disclaimer, the term of this patent is extended or adjusted under 35 U.S.C. 154(b) by 0 days.

(21) Appl. No.: 12/786,149

(22) Filed: May 24, 2010

Related U.S. Application Data

(63) Continuation of application No. 10/790,145, filed on Mar. 2, 2004, now Pat. No. 7,739,133.

(60) Provisional application No. 60/451,000, filed on Mar. 3, 2003.

(51) Int. Cl.
*G06Q 40/00* (2006.01)
(52) U.S. Cl. .................................. 705/4; 705/2; 705/3
(58) Field of Classification Search .................. 705/2–4; 715/260
See application file for complete search history.

(56) References Cited

U.S. PATENT DOCUMENTS

| | | | |
|---|---|---|---|
| 4,773,009 A * | 9/1988 | Kucera et al. | 715/260 |
| 7,343,308 B1 * | 3/2008 | Rojewski et al. | 705/4 |
| 2002/0035528 A1 | 3/2002 | Simpson et al. | |

OTHER PUBLICATIONS

Xanalysis Inc., PowerIndexing White Paper, Version 1, Apr. 2001 (12 pages).
Office Action mailed Apr. 3, 2006 for U.S. Appl. No. 10/790,145, filed Mar. 2, 2004.
Office Action mailed Oct. 7, 2008 for U.S. Appl. No. 10/790,145, filed Mar. 2, 2004.
Advisory Action mailed Jan. 22, 2009 for U.S. Appl. No. 10/780,145, filed Mar. 2, 2004.
Office Action mailed Apr. 27, 2009 for U.S. Appl. No. 10/790,145, filed Mar. 2, 2004.
Notice of Allowance mailed Feb. 1, 2010 for U.S. Appl. No. 10/790,145, filed Mar. 2, 2004.

* cited by examiner

*Primary Examiner* — Gerald J. O'Connor
*Assistant Examiner* — Linh Michelle Le
(74) *Attorney, Agent, or Firm* — Finnegan, Henderson, Farabow, Garrett & Dunner, LLP

(57) ABSTRACT

Systems consistent with the present invention automatically process data associated with insurance claims to identify insurance claims with subrogation potential. Text from an insurance claim file may be automatically analyzed to extract data that can be quantified to determine whether the claim may have subrogation potential.

8 Claims, 5 Drawing Sheets

FIGURE 5

| Subject | Verb | Object |
|---|---|---|
| O.V. | Struck | I.V. |

FIGURE 6

| Data Entry Field Heading | Entry |
|---|---|
| Loss state | New Jersey |
| Payment type | Collision |

US 7,966,204 B1

SYSTEM AND METHOD FOR PROCESSING INSURANCE CLAIMS

RELATED APPLICATIONS

This application is a continuation of application Ser. No. 10/790,145, filed Mar. 2, 2004 now U.S. Pat. No. 7,739,133, which claims the benefit of U.S. Provisional Application No. 60/451,000, filed Mar. 3, 2003, all of which are incorporated herein by reference.

DESCRIPTION OF THE INVENTION

1. Field of the Invention

This invention relates to systems and methods for processing insurance claims and particularly to systems and methods for processing data associated with insurance claims using a computer.

2. Background of the Invention

In a typical insurance claim, an insured submits a claim to an insurance company for costs associated with an injury or property damage, and the insurance company pays the claim. Some of the paid claims may be the result of third party fault. For example, a third party driver may have caused an accident that injured the insured. In such a case, the insurance company may be able to recover all or a portion of the amount paid on the claim from the responsible party. As a result, the insured may be required to subrogate the right to sue the at-fault third party in favor of the insurance company. Using the insured's subrogated rights, the insurance company may attempt to recover amounts paid on the claim from any third party responsible for the injury or damage. For instance, if an insured's car is destroyed in an auto accident caused by a third party, the insured's insurance company may pay the insured for the value of the car, and separately seek to recover the amount paid from the third party or the third party's insurance company.

One challenge for the insurance company in attempting to recover money paid on claims is that not all claims are the result of third party fault. For example, a single-car accident in which the driver/insured falls asleep and hits a tree is not likely to have an at-fault third party from which to recover. The insurance company must therefore determine which claims may be due to a third party fault and therefore have subrogation potential.

Currently, insurance companies rely on methods such as claim adjuster referrals and scheduled audits to identify cases in which there is a chance for subrogation and recovery. However, these traditional methods are inadequate because they miss recovery opportunities. Adjuster referrals use an insurance adjuster to manually review a paid claim to make recommendations regarding subrogation. Such a method is inadequate to identify all recoverable claims because the determination of recoverability is subjective, requires experience and knowledge, and is generally a secondary job responsibility for the adjuster. The quality and consistency of adjuster referrals varies, leading to missed recovery opportunities in some cases, while in others valuable resources are spent pursuing unproductive claims.

Scheduled audits are also problematic. In a scheduled audit, large numbers of files are selected either at random or using primitive selection criteria such as a claim amount or claim type. For instance, an insurance company might select for review all claims in which a collision payment was made. The selected claim files are then sent to an auditing company for a "closed claim study," in which the insurance company is typically charged on a per-file-reviewed basis. The auditing company typically uses specially trained auditors to manually review files to determine if there is a chance for recovery on any of the claims. The process is expensive and time consuming, and its success depends largely on the initial selection of claims to review and the diligence and discretion of the auditors.

Automation of the subrogation potential determination has been difficult because the information required to make the determination is not easily identifiable within a claim file. Subrogation recognition factors are often buried or obscured in adjuster notes that are accumulated over the life of the claim. Moreover, the content and form of a claim file can vary widely from company to company and adjuster to adjuster. Some files may be handwritten and kept on paper, while others may be kept electronically. Recognition and extraction of subrogation information from such files has traditionally been a task requiring extensive manual labor and significant expense.

SUMMARY OF THE INVENTION

Systems consistent with the present invention overcome the deficiencies of known systems by processing data associated with insurance claims in an efficient and accurate manner to identify claims with subrogation potential. In one embodiment, text from an insurance claim file may be automatically analyzed to extract data that can be quantified to determine whether the claim may have subrogation potential.

In an embodiment of the present invention, a method for processing insurance claims comprises analyzing text associated with an insurance claim to extract data elements related to the insurance claim's subrogation potential and assigning a score to each of the data elements. Whether the insurance claim has subrogation potential is determined based on the scores assigned to each of the data elements.

In another embodiment, an insurance claim is processed by receiving text corresponding to the insurance claim, automatically separating the text into groups of words, analyzing the groups of words to extract data elements, and assigning a value to each of the data elements, the value reflecting each data element's relevance to claim subrogation potential. The values assigned to the data elements are evaluated to determine whether the insurance claim has subrogation potential.

In still another embodiment of the present invention, a system for processing insurance claims comprises a text analyzer that analyzes text associated with an insurance claim and extracts data elements related to the insurance claim's subrogation potential, a rules engine that assigns a score to each of the data elements and determines if the insurance claim has subrogation potential based on the scores assigned to each of the data elements, and a processor to run the text analyzer and the rules engine Further in accordance with an embodiment of the present invention, a system for processing insurance claims comprises a text analyzer that receives text corresponding to the insurance claim, automatically separates the text into groups of words, and analyzes the groups of words to extract data elements, a rules engine that assigns a value to each of the data elements, the value reflecting each data element's relevance to claim subrogation potential, and evaluates the values assigned to the data elements to determine whether the insurance claim has subrogation potential, and a processor that runs the text analyzer.

Additional features and embodiments of the invention will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 5 is an example of a data table according to an embodiment of the present invention;

FIG. 6 is an example of a data table according to another embodiment of the present invention.

DETAILED DESCRIPTION

Insurance companies currently rely on methods such as adjuster referrals and scheduled audits to identify insurance claims that are potentially recoverable, e.g., claims that have subrogation potential. Current methods depend on manual recognition of potential recovery opportunity and are expensive and time consuming. These manual processes are prone to miss recovery opportunities or to waste resources on claims that have no subrogation potential. Subrogation recognition factors are often obscured in adjuster notes accumulated over the life of a claim, making electronic identification difficult. Utilizing innovative text extraction technology, one embodiment of the present invention enables insurance companies to analyze insurance claim data and identify potential recovery opportunities accurately and efficiently.

Systems consistent with an embodiment of the present invention deconstruct claim files, including adjuster notes, into data structures, such as data tables that may be used for data warehousing, data mining, analytics, etc. This data may be evaluated using scores based on, for example, industry practice, historical data, or state law, to automatically estimate a claim's subrogation probability.

Reference will now be made in detail to embodiments of the present invention, examples of which are illustrated in the accompanying drawings. Wherever possible, the same reference numbers will be used throughout the drawings to refer to the same or like parts.

Figure 1:
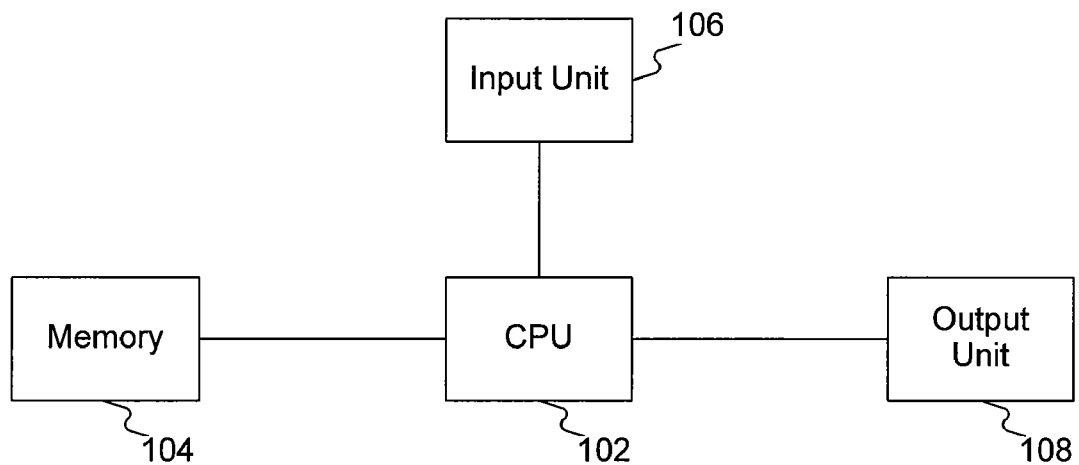
FIG. 1 is a block diagram of a computer system for the practice of an embodiment of the present invention.

FIG. 1 is a block diagram of a computer system 100 for the practice of an embodiment of the present invention. The system may include a computer, which includes a central processing unit (CPU) 102 connected with a memory 104, an input unit 106, and an output unit 108. Computer system 100 may include, for example, a commercially available programmable computer, such as a personal computer (PC), or a specially designed computer.

Memory 104 may store software and databases used by computer system 100. Memory 104 may be, for example, random access memory, read only memory, removable memory such as a CD-ROM, etc. Input unit 106 may be, for example, a keyboard, a communication device connected to another computer or network, a device for reading disks, or an optical scanner in conjunction with known optical character recognition (OCR) components and/or a combination of these types of input devices. Output unit 108 may be, for instance, a display, a communication device connected to another computer or network, a storage device, a printer, or a device for writing disks and/or a combination of these types of output devices. The components of system 100 may be contained in a single computer or may be distributed across multiple computers. For example, system 100 may be implemented across any type of network, e.g., the Internet, a LAN, or a WAN.

Figure 2:
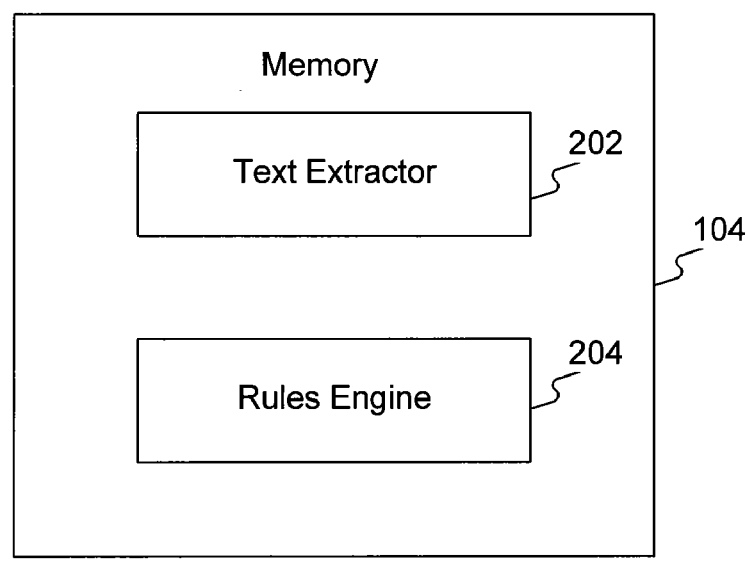
FIG. 2 is a block diagram of an embodiment of the present invention showing the relationship between various software components.

FIG. 2 is a block diagram of an embodiment of the present invention showing the relationship between various software components that may be stored in memory 104. Memory 104 may include a text extractor 202 and a rules engine 204. Text extractor 202 may be, for example, software configured to analyze unstructured text in an insurance claim file and transform it into usable data stored in a data structure such as a data table. Rules engine 204 may be, for example, software configured to process data from the data tables to determine whether a particular claim has subrogation potential. The operation of text extractor 202 and rules engine 204 will now be explained in greater detail.

Figure 3:
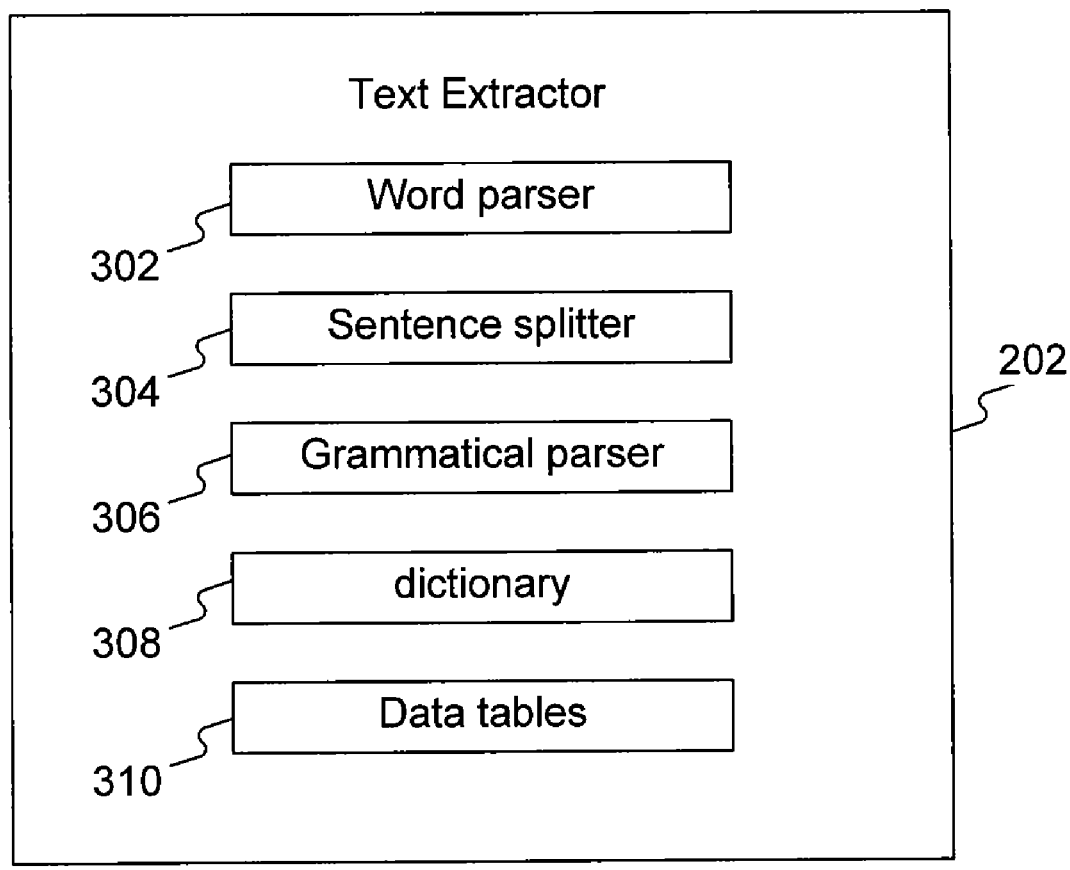
FIG. 3 is a block diagram of a text extractor according to an embodiment of the present invention.

FIG. 3 is a block diagram of text extractor 202 in greater detail according to an embodiment of the present invention. Text extractor 202 may include a word parser 302, a sentence splitter 304, a grammatical parser 306, a specialized dictionary 308, and data tables 310.

Word parser 302 may be a tool for breaking text into individual words. For example, a string of letters preceded and followed by a space may be identified as a word by word parser 302. Sentence splitter 304 may be a tool for grouping words into sentences. For example, a string of words followed by a punctuation mark such as a period may be designated as a sentence by sentence splitter 304. Word parser 302 and sentence splitter 304 may be implemented using, for example, PowerIndexing analysis software provided by Xanalys, Inc.

Grammatical parser 306 may be a tool to analyze words and sentences to determine what data may be relevant to a claim's subrogation potential. For example, grammatical parser 306 may separate field headings from data contained in the fields.

Dictionary 308 may be used by word parser 302, sentence splitter 304, and/or grammatical parser 308, for example, to identify common insurance terms or phrases that typically relate to claims with high subrogation potential.

The results of processing by word parser 302, sentence splitter 304, grammatical parser 306, and/or specialized dictionary 308 may be stored in data tables 310. One skilled in the art will appreciate that text extractor 202 may include fewer or more components than shown in FIG. 3 and that the one or more of the components may be combined or distributed over multiple computers.

Figure 4:
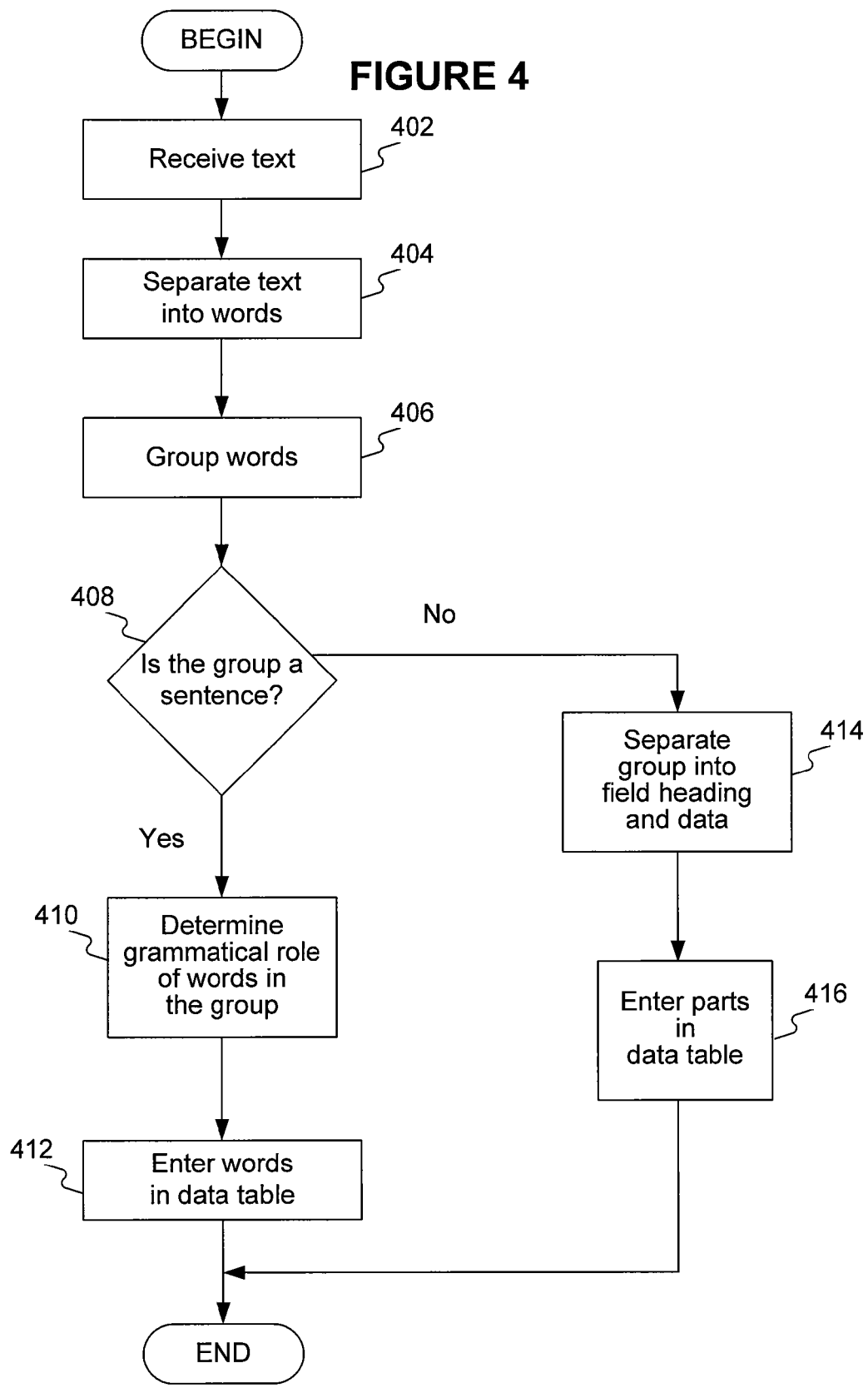
FIG. 4 is a flow diagram showing the steps carried out by a text extractor according to an embodiment of the present invention.

FIG. 4 is a flow diagram showing the steps carried out by text extractor 202 according to an embodiment of the present invention. Initially, unstructured text is received by text extractor 202 (step 402). For example, an electronic claim file may be imported or handwritten adjuster notes may be scanned using an optical character reader. Word parser 302 separates the text into individual words based on predefined rules (step 404). For instance, a string of letters preceded by a space and followed by a space may be designated to be a word by word parser 302. Alternatively, word parser 302 may match strings of characters to words stored in specialized dictionary 308 to identify words.

The text, now a series of words, may be subject to further grouping and analysis by sentence splitter 304 (step 406). In one embodiment, the words may be grouped into sentences or non-sentence textual groupings by sentence splitter 304 using sequences of letters, spaces, words, and punctuation. For instance, sentence splitter 304 may check each successive word to determine if punctuation follows the word. If punctuation does follow the word, sentence splitter 304 identifies the type of punctuation to determine whether the punctuation is end-of-sentence punctuation. For instance, if a word is followed by a period, sentence splitter 304 may determine if the period designates the end of a sentence. This may be accomplished by comparing the word followed by the period to terms stored in specialized dictionary 308. For example, if the word "Dr." is being analyzed, sentence splitter 304 may compare the letter preceding the period to abbreviations stored in specialized dictionary 308 and determine that the period does not designate the end of a sentence. If the word is not found in the list of abbreviations, sentence splitter 304 may determine that the period is the end of a sentence. Other contextual clues surrounding the period may also be considered. For instance, if a period is followed by two spaces and the next word is capitalized, sentence splitter 304 may determine that the period is the end of a sentence.

Non-sentence textual groupings may be, for example, data fields from a claim form. Insurance claim files may contain forms with spaces or data fields in which particular information has been entered by an insured or a claim adjuster. For example, a claim form may have data fields for percentage fault, the state in which the loss occurred, payment type, and coverage codes. Because such information may not be in traditional sentence form, sentence splitter 304 may separate the information in each data field and group the information with a heading of the data field. For example, in a file having an entry field heading "percent fault" and an entry of "50%," the terms "percent fault" and "50%" may be grouped together as a non-sentence textual grouping.

Once the textual input has been grouped (e.g., into sentences and non-sentence text groupings), grammatical parser 306 may determine the type of grouping (step 408) and analyze the grouping accordingly. If the group is a sentence (step 408, Yes), grammatical parser 306 may identify the grammatical role of the words in the sentence (step 410). For instance, in one embodiment, grammatical parser 306 identifies and extracts the subject, verb, and object of each sentence by comparing the words in each sentence to terms stored in specialized dictionary 308, such as commonly used insurance claim terms. In the context of auto insurance, specialized dictionary 308 may contain commonly used terms for the actors (subject or object) such as insd., insured, IV, insured vehicle, OV, other vehicle, claimant, clmt., etc. Specialized dictionary 308 may also include commonly used terms for the action (verb) such as, for example, "struck," "hit," "collided," "crashed," etc. The context and order of the terms may also be used to determine which words in the sentence correspond to subject, verb, and object. For example, in the most common sentence structure, the subject is followed by the verb, which is then followed by the object. Next, the parsed words are entered into data tables 310 (step 412). For example, the subject, object, and verb combinations identified by grammatical parser 306 may be entered into a data table.

If the group is a non-sentence textual group (step 408, No), then grammatical parser 306 may determine which part of the grouping is a data entry field heading (e.g., percentage fault) and which part is an entry (e.g., 50%) (step 414). This may be aided by reference to specialized dictionary 308 containing commonly used insurance terms. For example, specialized dictionary 308 may contain commonly used data entry field headings such as state of loss, percentage fault, payment type, coverage code, etc. If part of the non-sentence grouping is found in specialized dictionary 308, that portion of the grouping may be identified as the data entry field heading and the remainder of the grouping may be identified as the entry. Once the parts of the grouping are identified, they are stored in data tables 310 (step 416). Consistent with an embodiment of the present invention, all or a part of the process shown in FIG. 4 may be repeated until all of the received text is analyzed. For example, grammatical parser 306 may repeat steps 408-416 until each grouping is processed.

FIG. 5 is an example of a data table according to an embodiment of the present invention. Data table 500 represents a table of sentences separated into subject, verb, and object. Each row may represent data from a sentence, and the columns may correspond to the subject, verb, and object of the sentence. The combination in data table 500 may represent the sentence "O.V. struck I.V.", i.e., the other vehicle struck the insured vehicle. Data table 500 may include any number of rows and columns consistent with the present invention. Furthermore, the data may be stored in other formats or data structures, such as a tree.

FIG. 6 is an example of a data table according to another embodiment of the present invention. Data table 600 represents a table of non-sentence textual groupings separated into data entry field headings and entries. The rows may correspond to a particular non-sentence grouping while the columns refer to the type of data. The data stored in data table 600 may represent two facts "Loss state-New Jersey" and "Payment type-collision." Data table 600 may include any number of rows and columns consistent with the present invention. Furthermore, the data may be stored in other formats or data structures, such as a tree.

Once the claim data has been analyzed and stored in data tables by text extractor 202, rules engine 204 may use the claim data to determine whether the claim has subrogation potential, i.e., whether there is a party, other than the insured, that may be responsible for the damage or injury leading to the claim. Rules engine 204 may include a set of rules created based on factors such as the jurisdiction in which the loss occurred, fault percentage, payment type, coverage codes, information about how the loss occurred, etc. These rules may be based on, for example, industry practice (e.g., claims that have a fault percentage less than 50% are typically recoverable), historical data (e.g., claims costing over $10,000 usually have had at least some recovery potential), and state law (e.g., a particular state may have very difficult subrogation laws, making recovery of claims arising there unlikely).

Figure 7:
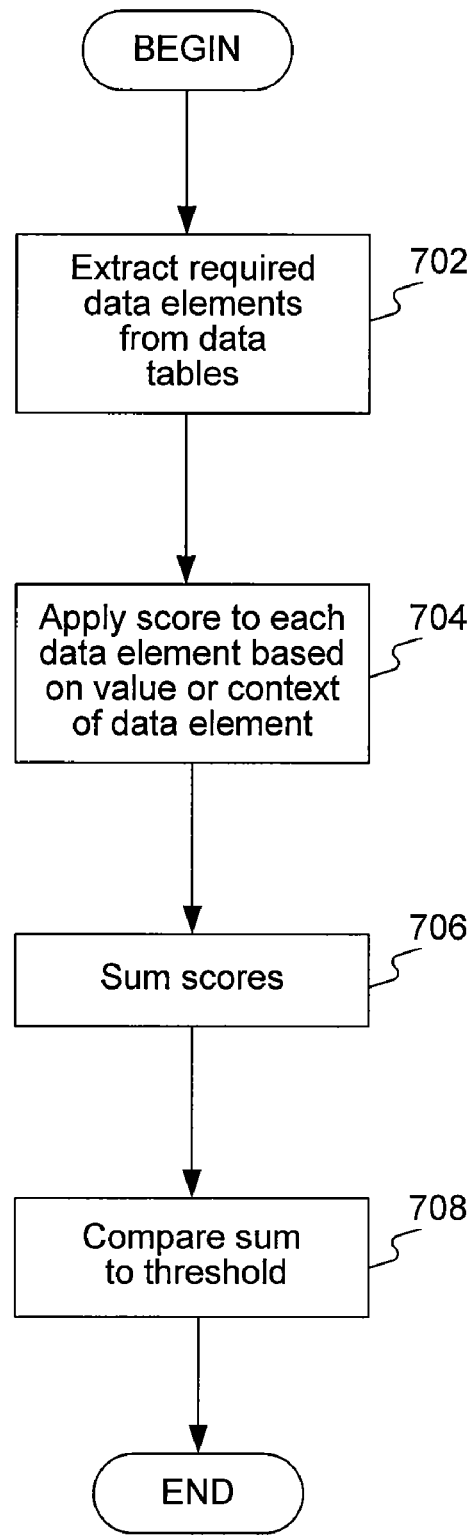
FIG. 7 is a flow diagram of a process performed by a rules engine according to an embodiment of the present invention.

FIG. 7 is a flow diagram of a process performed by rules engine 204 according to an embodiment of the present invention. Based on a stored rule, rules engine 204 extracts the required data elements from data tables 310 (step 702). In one example, rules engine 204 may consider the data elements of the loss state, the percentage fault, the payment type, and the description of the loss to determine whether a claim has subrogation potential. Each of these data elements is obtained from data tables 310 previously created by text extractor 202. For example, the loss state, the percentage fault, and the payment type may be extracted from one or more data tables of non-sentence groupings such as data table 600. Rules engine 204 identifies the desired data elements by matching data field headings in the data table and extracting the corresponding entry. The rules engine may obtain information about the description of the loss from a data table containing sentence combinations of subjects, verbs, and objects, such as data table 500.

Each data element is then assigned a score, e.g., based on its value or context (step 704). For example, rules engine 204 may follow a rule that if a claim file contains data showing the percentage fault is 100%, indicating that the insured was completely at fault, the percentage fault data element would be given a negative score because this factor would make recovery impossible. The scoring rules may be determined, for example, using existing historical data from claims files that have already been processed. The data from each of the historical claims files may be analyzed to develop a relationship between data values and the possibility of recovery.

Scoring rules may also be based on the actor or action involved. For example, if the insured is identified as the actor, there is unlikely to be another responsible party from which to recover. For instance, if the textual phrase, "the insured struck the other vehicle" is input, grammatical parser 306 will extract "insured" as the actor, "struck" as the verb, and "other vehicle" as the object. Rules engine 204 may implement a rule that, when the actor is "insured," that data element receives a negative score because it is likely that the insured is at fault and there is no other party from which to recover.

In one embodiment, if the data element "loss description" includes the data "rear-ended" or "struck while parked," a rule may score the data element higher than if the data is "struck at an intersection" or "parking lot accident." In another embodiment, a rule may assign a score based on the number or types of claim payments made. For example, if the "number of vehicles" is two or more and a related personal injury claim has been paid, the score may be low or 0. In another rule, if the "insured driver" is the same as the named insured, then few or 0 points may be assigned to the "insured driver" data element. If the "insured driver" is not the named insured, then a number of points, e.g., 10 points, may be assigned. In still another rule, if a "police report number" data element shows that a police report is available, the data element may be given more points than if no police report is available. Other rules and data elements may also be used consistent with the present invention.

After scoring has been assigned to each of the data elements, the scores are analyzed to determine a potential for subrogation of the claim. For example, the scores may be summed together (step 706). The sum may be compared to a threshold value to determine the likelihood of subrogation (step 708). If the sum is greater than a threshold, the claim has subrogation potential. If the sum is less than the threshold, the claim does not. Alternatively, higher scores may indicate increased chance of recovery and lower scores indicate decreased chance of recovery. In one embodiment, the threshold may be zero.

By automating and streamlining the processing of data associated with insurance claims, systems consistent with the present invention make it feasible for an insurance company to quickly and accurately analyze an insurance claim to determine its subrogation potential.

Other embodiments of the invention will be apparent to those skilled in the art from consideration of the specification and practice of the invention disclosed herein. For example, a text extractor and a rules engine may be implemented in software and stored on a CD-ROM or available for download over a network. Alternatively, the text extractor and the rules engine may be provided separately or by different parties.

It is intended that the specification and examples be considered as exemplary only, with a true scope and spirit of the invention being indicated by the following claims.

We claim:

1. A computer system for processing an insurance claim, comprising:
   a processor; and
   a memory storing computer instructions which, when executed by the processor, cause the system to perform a method for processing an insurance claim, the method comprising:
   receiving, by a text analyzer, text corresponding to the insurance claim,
   automatically separating, by the text analyzer, the text into groups of words, and
   analyzing, by the text analyzer, using a specialized insurance dictionary, the groups of words to extract data elements; and
   assigning, by a rules engine, a value to each of the data elements, the value reflecting each data element's relevance to claim subrogation potential, and
   evaluating, by the rules engine, the values assigned to the data elements to determine whether the insurance claim has subrogation potential.

2. The system of claim 1, further comprising a separate processor that runs the rules engine.

3. The system of claim 1, wherein the values are based on historical data about subrogation of insurance claims.

4. The system of claim 1, wherein the values are based on industry practice regarding subrogation of insurance claims.

5. A system for processing an insurance claim based on different types of documents related to the insurance claim, comprising:
   a processor; and
   a memory storing computer instructions which, when executed by the processor, cause the system to perform a method for processing an insurance claim, the method comprising:
   receiving, by a text analyzer, at least two different types of documents corresponding to the insurance claim, and
   automatically processing, by the text analyzer, the text of each document according to its document type, using a specialized insurance dictionary, to extract data elements; and
   assigning, by a rules engine, a value to each of the data elements, the value reflecting each data element's relevance to claim subrogation potential, and
   evaluating, by the rules engine, the values assigned to the data elements to determine whether the insurance claim has subrogation potential.

6. The system of claim 5, wherein the document types include at least two of: sentence textual group document, non-sentence textual group document, graphic document, comma separated value document, and tab-delimited text document.

7. The system of claim 5, wherein one of the documents is a sentence textual group document, and wherein the text analyzer processes the text of the sentence textual group document according to the grammatical roles of words in the sentence textual group document.

8. The system of claim 5, wherein one of the documents is a non-sentence textual group document, and wherein the text analyzer processes the text of the non-sentence textual group document according to field headings and data in the non-sentence textual group document.

* * * * *